US008171521B2

(12) United States Patent
Choi et al.

(10) Patent No.: US 8,171,521 B2
(45) Date of Patent: May 1, 2012

(54) SYSTEM AND METHOD FOR MANAGING NETWORK BY VALUE-BASED ESTIMATION

(75) Inventors: Young Han Choi, Daejeon (KR); Hyoung Chun Kim, Daejeon (KR); Tae Ghyoon Kim, Daejeon (KR); Do Hoon Lee, Daejeon (KR); Eungki Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1082 days.

(21) Appl. No.: 12/039,858

(22) Filed: Feb. 29, 2008

(65) Prior Publication Data

US 2008/0313701 A1 Dec. 18, 2008

(30) Foreign Application Priority Data

Jun. 14, 2007 (KR) ......................... 10-2007-0058327

(51) Int. Cl.
*G06F 17/00* (2006.01)
(52) U.S. Cl. ............................................. 726/1; 709/223
(58) Field of Classification Search .................... 726/1; 709/223–226
See application file for complete search history.

(56) References Cited

U.S. PATENT DOCUMENTS

| 7,096,260 | B1 * | 8/2006 | Zavalkovsky et al. | ........ 709/223 |
| 7,447,768 | B2 * | 11/2008 | Kelly et al. | ................... 709/224 |
| 7,756,960 | B2 * | 7/2010 | Gonguet et al. | .............. 709/223 |
| 7,774,468 | B1 * | 8/2010 | Nag et al. | ...................... 709/226 |
| 7,953,845 | B2 * | 5/2011 | Black et al. | ................... 709/224 |

FOREIGN PATENT DOCUMENTS

KR 1020030050619 6/2003

OTHER PUBLICATIONS

Yong-Zheng Zhang et al. "A Risk Assessment Approach for Network Information System." Proceedings of the Third International Conference on Machine Learning and Cybernetics, Shanghai, Aug. 26-29, 2004. pp. 2949-2952.

* cited by examiner

*Primary Examiner* — Kambiz Zand
*Assistant Examiner* — Amare F Tabor
(74) *Attorney, Agent, or Firm* — Ladas & Parry LLP

(57) ABSTRACT

A system and method for managing a network by value-based estimation is provided. A network device requesting communication is defined as an active point and a network device receiving a request for communication is defined as a passive point. A value of a network device is determined according to the number of active points connected to the corresponding network device, and a value of a network device that is in a path of communication between network devices is determined based on a value of a network device passing through the corresponding network device. When a policy for changing a network environment is transferred in a state where the values of the network devices have been estimated, a policy conflict test is performed on the basis of the estimated values of the network devices, thereby determining application of the policy in due consideration of the values and significance of the network devices.

8 Claims, 3 Drawing Sheets

BEFORE W2 INSTALLATION

AFTER W2 INSTALLATION

SYSTEM AND METHOD FOR MANAGING NETWORK BY VALUE-BASED ESTIMATION

BACKGROUND OF THE INVENTION

1. Field of the Invention

The present invention relates to a large network management technology, and more particularly, to a system and method for managing a network by value-based estimation, which is applied to a dynamically changing large network environment by estimating a value of a network device according to the amount of communication requested from or passing through the device.

2. Description of the Related Art

In a large network, security equipment is managed using an established policy for efficient management and collective command transfer. A system that manages a network using a policy is called a policy-based network management system. In the policy-based network management system, a policy must be applied in due consideration of policy transfer, a policy conflict with an existing policy, and policy application between heterogeneous devices.

However, when verifying the policy conflict, a conventional network management system considers only a conflict with an existing policy, without considering a value and significance of a network device. Even if the value and significance of the network device are considered, a manager estimates the value of the network device on the basis of experience. Thus, objective estimation cannot be performed, and a method for automatic policy application based on the objective estimation has not been proposed.

SUMMARY OF THE INVENTION

Accordingly, the present invention is directed to a system and method for managing a network by value-based estimation, which substantially obviates one or more problems due to limitations and disadvantages of the related art.

It is an object of the present invention to provide a system and method for managing a network by value-based estimation, in which on the assumption that a network device requesting communication is defined as an active point and a network device receiving a request for communication is defined as a passive point, a value of a network device is determined according to the number of active points connected to the corresponding network device, and a value of a network device that is in a path of communication between network devices is determined based on a value of a network device passing through the corresponding network device. In the system and method for managing a network by value-based estimation, when a policy for changing a network environment is transferred in a state where the values of the network devices have been estimated, a policy conflict test is performed on the basis of the estimated values of the network devices, thereby determining application of the policy.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a system for managing a network by value-based estimation, including: a value estimating unit configured to collect information of network devices installed within a network for network estimation, and estimate values of the network devices on the basis of the collected information; a storage unit configured to store the values of the estimated network devices; a policy determining unit configured to verify validity of a policy by using the estimated values and determine application of the corresponding policy; and a policy executing unit configured to convert the corresponding policy into a command suitable for the network device when the policy is determined to be reflected to the network device and transfer the command.

In another aspect of the present invention, there is provided a method for managing a network by value-based estimation, the method comprising the steps of: (a) estimating values with respect to network devices including node network devices that perform communication and path network devices through which communication passes between the node network devices; and (b) determining whether to change a policy on the basis of the values of the network devices in response to a request for a policy change from a manager.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1A:
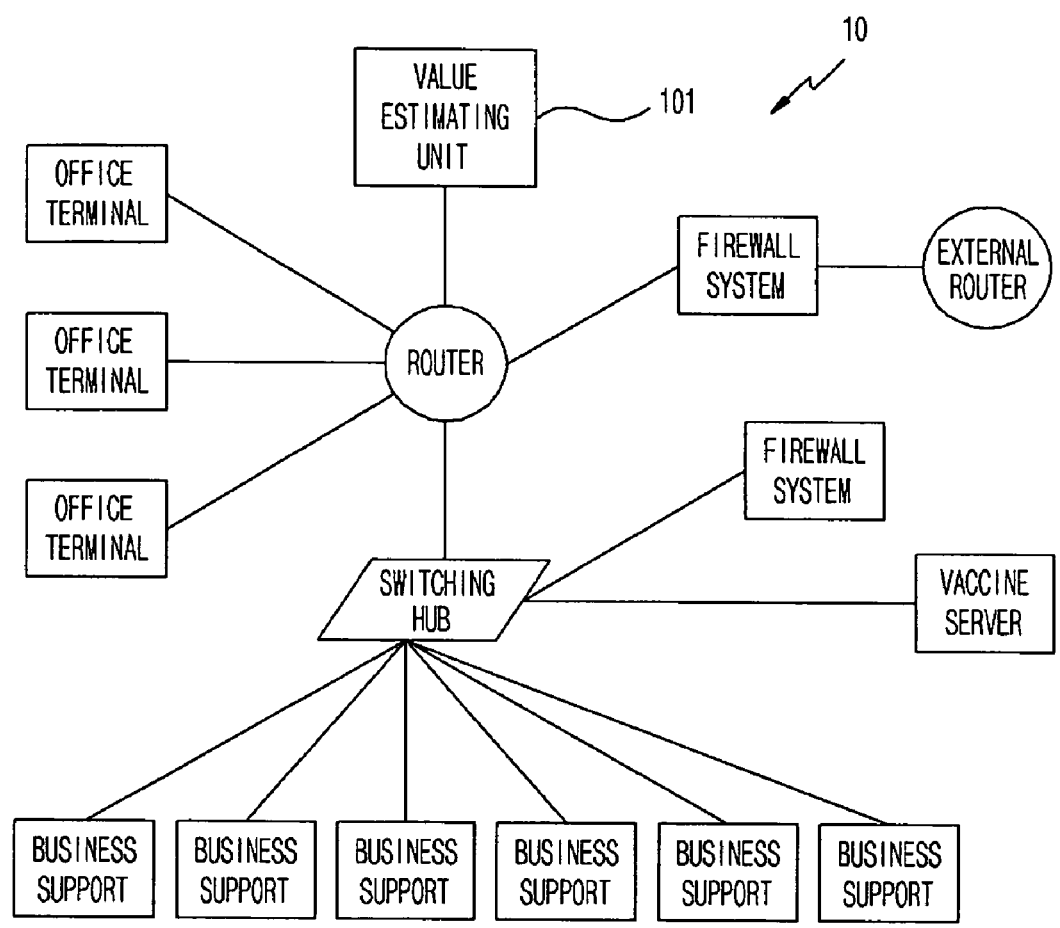
FIG. 1A illustrates a network employing a system for managing a network by value-based estimation according to an embodiment of the present invention.
Figure 1B:
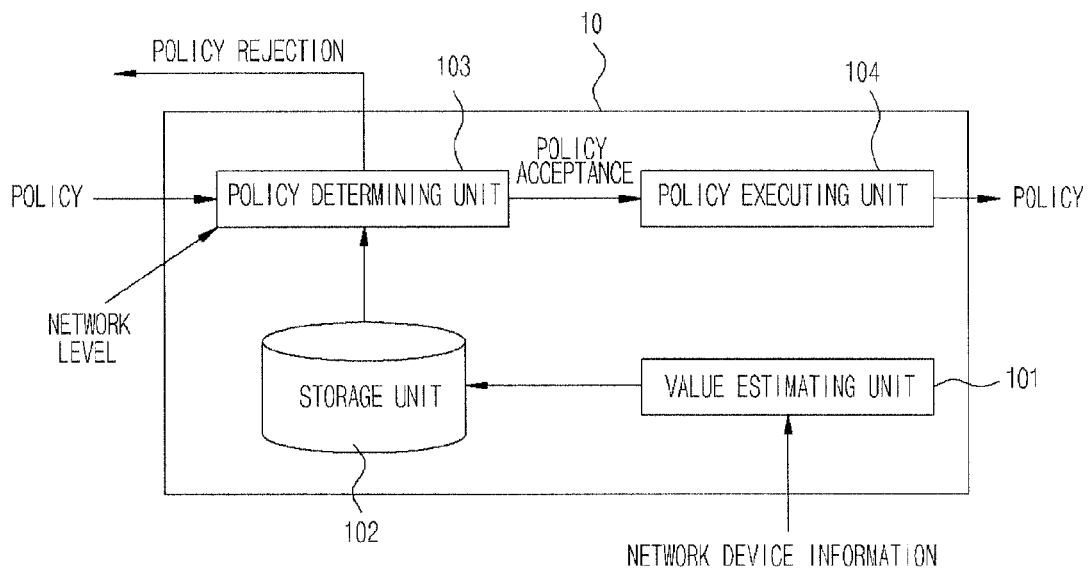
FIG. 1B illustrates a system for managing a network by value-based estimation according to an embodiment of the present invention.

FIG. 1A illustrates a network employing a system for managing a network by value-based estimation according to an embodiment of the present invention, and FIG. 1B illustrates the system for managing a network by value-based estimation according to an embodiment of the present invention.

As shown in FIG. 1A, various network devices such as a web server, a database server, a client computer, a router and a firewall can be connected in a large network employing a system 10 for managing a network by value-based estimation (hereinafter, also referred to as a value-based network management system) according to the embodiment of the present invention. A policy for network management with respect to the network devices are established such that the policy is applied in due consideration of the value of the corresponding network device.

To this end, the value-based network management system 10 collects, analyzes and controls information of network devices being managed. Then, the value-based network management system 10 estimates values of the network devices by using the collected information. When a polish is established, the value-based network management system 10 verifies validity of the policy on the basis of the estimated values, and then the corresponding policy is applied.

To perform those operations, as shown in FIG. 1B, the system 10 for managing a network by value-based estimation according to the embodiment of the present invention includes a value estimating unit 101, a storage unit 102, a policy determining unit 103, and a policy executing unit 104. The value estimating unit 101 collects information of network devices installed within the network for value estimation, and estimates values of the network devices on the basis of the collected information. The storage unit 102 stores the estimated values of the network devices. The policy determining unit 103 verifies validity of a policy using the estimated values, and determines application of the corresponding policy. When the policy is determined to be reflected to the network device, the policy executing unit 104 converts the corresponding policy into a command suitable for the network device, and transfers it.

In this embodiment, the policy determining unit 103 determines to accept the policy on the basis of a network level, and the policy executing unit 104 selects any one method of command-line input (CLI) and application programming interface (API) for the policy application.

The system 10 for managing a network by value-based estimation estimates values of network devices by using information sent from the network devices, and stores the estimated values in the storage unit 102. When a policy is transferred from a manager, the system 10 for managing a network by value-based estimation compares the stored value with a network level to determine whether to accept the transferred policy. The network level is variable and is determined by a network manager in due consideration of a network state. If a value of the network device is higher than the network level, the policy may be rejected, but if not, the policy must be applied to the network all the time. If the manager wants for the policy to be applied all the time, the network level may be set to the highest value.

A value of a network device estimated by the system 10 for managing a network by value-based estimation is associated with significance of a service provided by the network device. That is, a value of a network device providing a significant service can be estimated to be high. According to this embodiment, service significance of a network device is in proportion to the number of clients accessing the network device. This is because the network device providing more significant service receives more communication requests from other network devices. However, this method may have a limitation that the service may be estimated only based on the number of communication requests. Therefore, according to the embodiment of the present invention, a weight is set for each communication request, so that a value of a network device that requests a service can be reflected.

Figure 2:
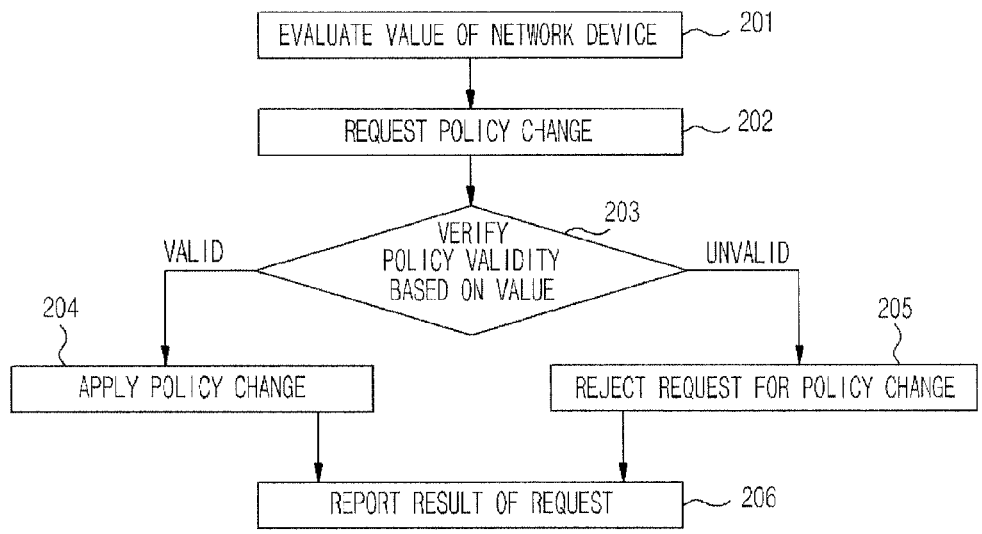
FIG. 2 is a flowchart of a method for managing a network by value-based estimation according to an embodiment of the present invention.

FIG. 2 is a flowchart of a method for managing a network by value-based estimation according to an embodiment of the present invention.

Referring to FIG. 2, in step 201, the valued-based network management system estimates values of network devices before a request for a network policy change is transferred. A method for estimating a value of a network device will be described with reference to FIGS. 3 and 4. In step 203, when the request for a policy change is transferred from a manager, it is verified whether a corresponding policy is valid on the basis of the values of the network devices. To verify the validity of the policy, it is checked whether the policy to be established conflicts with an existing policy. If the policy does not conflict with the existing policy, the policy is selected, and finally the application of the corresponding policy is determined on the basis of the values of the network devices.

The policy application is determined by the estimated values of the network devices and the network level being managed. The network level is determined according to a network risk. If the network device has a value that is lower than the network level, the selected policy must be applied to the network device all the time. However, if the network device has a value that is higher than the network level, the network device may reject the selected policy. If the request for the policy change is valid, the policy change is applied in step 204, and if not, the policy change is rejected in step 205. A result of the request for the policy change is reported to the manager in step 206.

Figure 3:
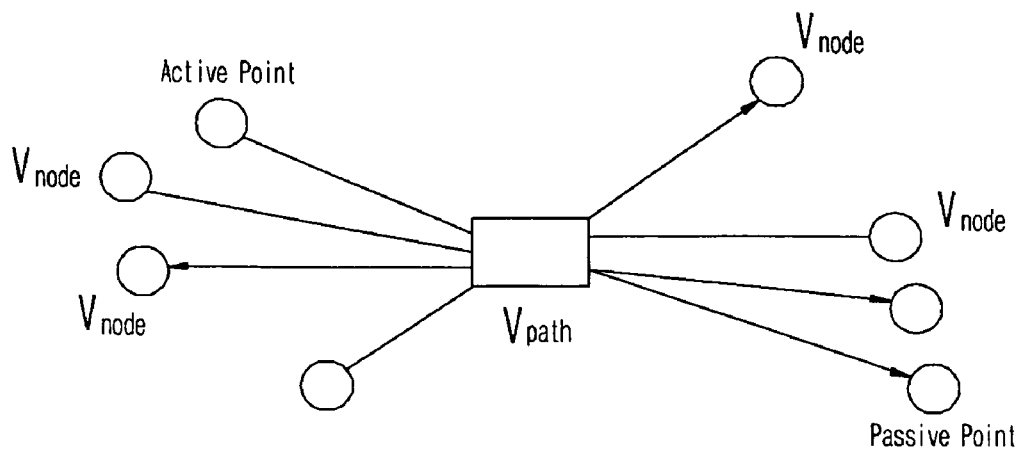
FIG. 3 illustrates a value estimation model for network devices according to an embodiment of the present invention.

FIG. 3 illustrates a value estimation model for network-devices according to an embodiment of the present invention.

In FIG. 3, a node network device $V_{node}$ represents a network device that performs communication, such as a client computer a web server, a database server and so on. A path network device $V_{path}$ represents a network device, which is in a path of communication between node network devices $V_{node}$ and $V_{node}$, such as a router, a firewall and so. In the case of value-based policy establishment, a policy transferred to the path network device $V_{path}$ is applied. A node network device that requests communication is defined as an active point, and one that receives a communication request is defined as a passive point.

In a value estimation algorithm for a network device according to an embodiment of the present invention, significance of one node network device $V_{node}$ increases as the node network device $V_{node}$ receives communication requests from more other network devices. That is, the value of a node network device $V_{node}$ is determined according to the number of active points connected to the corresponding node network device $V_{node}$. As the number of active points increases, the significance of the node network device $V_{node}$ also increases. When a network device with high significance makes a communication request to another network device as an active point, the communication request is weighted so that the communication request has a higher value than a communication request made by a network device with low significance. Unlike the node network device $V_{node}$, a value of a path network device $V_{path}$ cannot be determined with the division into active points and passivation points. The value of the path network device $V_{path}$ is set to be higher than the highest one of values of network devices connected to a communication channel passing through the path network device $V_{path}$. Thus, communication jamming between network devices connected by the path network device $V_{path}$ can be prevented.

Figure 4:
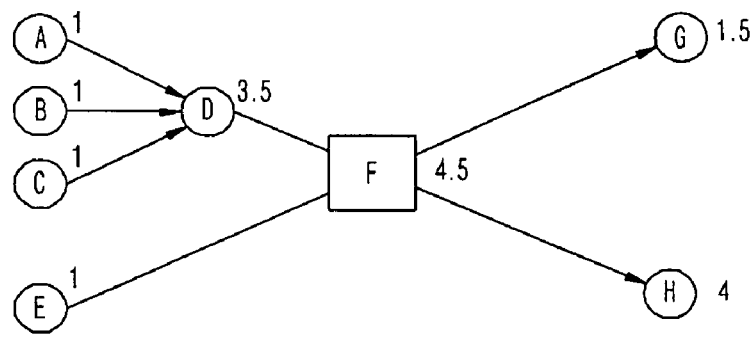
FIG. 4 illustrates one example of value estimation for network devices according to an embodiment of the present invention.

FIG. 4 illustrates one example of value estimation for network devices according to an embodiment of the present invention.

As shown in FIG. 4, according to an embodiment of estimating a value in the value-based network management system, node network device D is a passive point of node network devices A, B and C, and a weight of the node network device D is set to 3.5. In this case, values of node network devices A, B and C requesting communication are set to 1, and weights thereof are set to 0.5. A node network device G which is a passive point of the node network device C has a value of 1.5 which is higher than a value of a node network device E. A node network device H which is a passive point of the node network device D has a value of 4. Communication that passes through a path network device F is communication between the node network devices D and H and between the node network devices E and G. The node network device H has the value of 4, which is the highest among the values of the four node network devices D, H, E and H. Thus, in order to accept the communication between the node network devices, a value of the path network device F is set to 4.5 which is higher than the value of the H node. In this manner, the value of every network of FIG. 4 is estimated. When a policy is established based on the corresponding value, the value-based network management system determines the policy application.

Embodiment

A method for estimating a value of a network device is based on the following Equations:

$$V_{node}(l) = \sum_{n=1}^{m} \alpha_n V_{node}(n) \quad \text{Eq. (A)}$$

$$V_{path}(l) = \text{Max}(V) + W \quad \text{Eq. (B)}$$

where $\alpha_n$=weight of node, $1 \leq n, 1 \geq m$, m is the total number of nodes, V denotes a set of node values, and W=weight of path.

Equation (A) is used to estimate a value of a node network device $V_{node}$. In Equation (A), $\alpha_n$ denotes a weight varying with a network device, which is set such that significance can be allocated differently according to network devices requesting communication even if the same communication channel is used. After the value of the node network device $V_{node}$ as an active point is estimated, a value of a path network device $V_{path}$ is estimated by Equation (B). The value of the path network device $V_{path}$ is estimated to be higher than a value of a node network device connected to a communication channel passing through the path network device $V_{path}$.

Figure 5A:
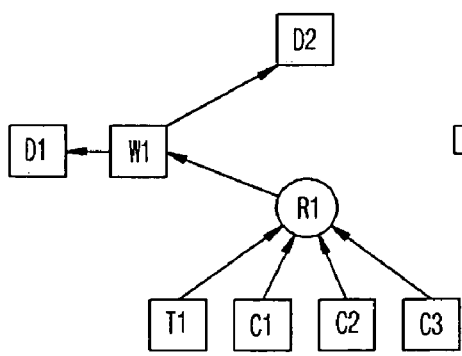
FIGS. 5A and 5B illustrate a detailed example of value estimation for network devices according to an embodiment of the present invention.
Figure 5B:
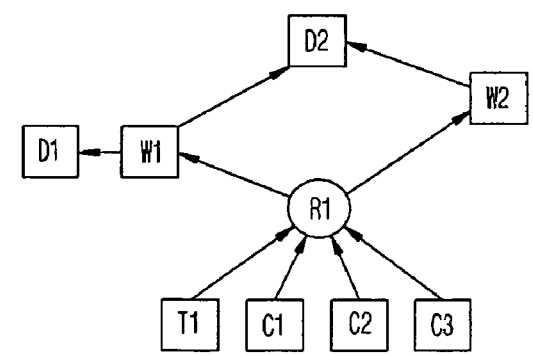

FIGS. 5A and 5B illustrate a detailed example of value estimation for network devices according to an embodiment of the present invention.

FIG. 5A illustrates a network configuration before installation of web server W2, and FIG. 5B illustrates a network configuration after the installation of web server W2, so that a dynamic change of the network configuration can be seen. An arrow in the drawing denotes a direction of a communication request. According to this embodiment, a weight of a node network device calling only itself is set to 1, and a weight of a web server is set to 1.5, and a weight of a router is set to 2. A network level of a manager is set to 10. If a policy for blocking a communication port of database D2 is transferred, policy application is determined as follows:

Values of network devices before installation of web server W2

$$V_{node}(T1) = V_{node}(C1) = V_{node}(C2) = V_{node}(C3) = 1$$

$$V_{node}(W1) = V_{node}(T1) + V_{node}(C1) + V_{node}(C2) + V_{node}(C3) = 4$$

$$V_{node}(D1) = \alpha_{W1} \times V_{node}(W1) = 1.5 \times 4 = 6$$

$$V_{node}(D2) = \alpha_{W1} \times V_{node}(W1) = 1.5 \times 4 = 6$$

$$V_{path}(R1) = \text{Max}(V_{node}(T1, C1, C2, C3, W1, W2)) + W = 4 + 2 = 6$$

Values of network devices before installation of web server W2

$$V_{node}(T1) = V_{node}(C1) = V_{node}(C2) = V_{node}(C3) = 1$$

$$V_{node}(W1) = V_{node}(W2) = V_{node}(T1) + V_{node}(C1) + V_{node}(C2) + V_{node}(C3) = 4$$

$$V_{node}(D1) = \alpha_{W1} \times V_{node}(W1) = 1.5 \times 4 = 6$$

$$V_{node}(D2) = \alpha_{W1} \times V_{node}(W1) + \alpha_{W2} \times V_{node}(W2) = 1.5 \times 4 + 1.5 \times 4 = 12$$

$$V_{path}(R1) = \text{Max}(V_{node}(T1, C1, C2, C3, W1, W2)) + W = 4 + 2 = 6$$

where R denotes a router, W denotes a web server, D denotes a database server, T denotes a terminal and C denotes a computer.

The values of the network devices of FIGS. 5A and 5B can be estimated by the above-described method. If a manager transfers a policy to router R1 in order to block a service of the database D2, the corresponding policy is applied because the value of the database D2 before the installation the web server W2 is 6 which is lower than the network level of 10. However, when the values of the network devices are estimated after the web server W2 is installed, the value of the database D2 is 12 because of the web server W2. Accordingly, the policy for blocking the service of the database D2 may be rejected in the value-based network management system. This is because the value of the database D2 in the case of providing a service to two web servers W1 and W2 is higher than that in the cases of providing the service to the web server W1, and thus more damage may occur in the network configuration of FIG. 5B than the network configuration in FIG. 5A in the event that the service is not provided. The system for managing a network by value-based estimation changes values of network devices depending on a dynamic network circumstance, so that a policy can be applied in due consideration of a result of the policy application.

As described so far, in the system and method for managing a network by value-based estimation according to exemplary embodiments, a network is managed based on values of network devices, so that network management based on characteristics of network devices can be achieved.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A system for managing a network by value-based estimation, comprising:
 a value estimating unit configured to collect information of a plurality of network devices installed within a network for network estimation, and estimate values of the plurality of network devices on the basis of the collected information;
 a storage unit configured to store the values of the estimated network devices;
 a policy determining unit configured to verify validity of a policy to each of plurality of network devices by using the estimated values and determine application of the corresponding policy, wherein the validity of the policy compares a predetermined first value with a second value generated from each of plurality of network devices by using the estimated values; and a policy executing unit configured to convert the corresponding policy into a command suitable for the respective network device when the policy is determined to be reflected to the respective network device and transfer the command, wherein the collected information of the network devices are configured to change based on an a change of the network devices, wherein the change of the network devices comprises at least one or more additions or removals of the plurality of network devices, wherein the compared difference between the predetermined first value and the second value generated from the at least one of more of the plurality of network devices changes based on the change of the plurality of network devices, wherein the changed difference between the predetermined first value and the second value generated from the at least one of more of the plurality of network devices is evaluated to determine if the corresponding policy has changed based on the second value generated from the at least one of more of the plurality of network devices.

2. A method for managing a network by value-based estimation, the method comprising:

providing a processor and a memory, the memory having stored thereon:

(a) estimating values with respect to a first number of a plurality network devices comprising node network devices which perform communication, and path network devices through which communication passes between the node network devices; and (b) determining whether to change a policy based on the values of the plurality of network devices in response to a request for a policy change from a manager, wherein the values of at least one or more of the plurality of network devices changes as the number of the plurality of devices change, wherein the determining whether to change the policy to the request from the manager is done each time the number of the plurality of network devices changes by evaluating a difference between the value of each of the respective devices and a predetermined value of a network level, wherein the difference between the value of each of at least one or more of the plurality of network devices and the predetermined value of a network level changes each time the number of the plurality of devices change.

3. The method of claim 2, wherein the step (a) comprises:
(a-1) estimating a value of the node network device based on another network device that requests communication with the node network device, and
wherein the another network device increase the first number of the plurality of network devices by 1.

4. The method of claim 3, wherein the step (a) comprises:
(a-1-1) estimating a value of the path network device based on a value of the node network device that performs communication passing through the path network device.

5. The method of claim 4, wherein the value of the path network device is set to be higher than a highest value among the values of the node network devices that are connected to respective communication channels passing through the path network device.

6. The method of claim 2, wherein the step (b) comprises:
(b-1) verifying whether the policy is valid according to the values of the respective network devices;
(b-2) checking whether the policy conflicts with an existing policy;
(b-3) selecting the policy if the policy does not conflict with the existing policy; and
(b-4) comparing the value of the respective network device with the predetermined value of the network level being managed with respect to the selected policy and determining application of the policy.

7. The method of claim 6, wherein the step (b-4) comprises:
(b-4-1) determining predetermined value of the network level according to a network risk; and
(b-4-2) applying the selected policy all time if the network device has a lower value than the predetermined value of the network level.

8. The method of claim 2, further comprising:
(c) reporting a result of the request for the policy change to the manager.

* * * * *